United States Patent [19]
Oehy et al.

[11] Patent Number: 5,102,240
[45] Date of Patent: Apr. 7, 1992

[54] MOUNTING MECHANISM FOR A MEMBER ADAPTED TO ROTATE AT HIGH SPEED AROUND A VERTICAL AXIS

[75] Inventors: Peter Oehy, Winterthur; Rainer Busch, Seuzach, both of Switzerland

[73] Assignee: Maschinenfabrik Rieter AG, Winterthur, Switzerland

[21] Appl. No.: 608,358

[22] Filed: Nov. 2, 1990

[30] Foreign Application Priority Data

Nov. 2, 1989 [DE] Fed. Rep. of Germany ....... 3936530

[51] Int. Cl.⁵ ............................................. F16C 33/66
[52] U.S. Cl. .................... 384/472; 384/465; 384/469; 57/74
[58] Field of Search ............... 384/322, 397, 415, 462, 384/465, 469, 472, 473, 226, 227, 241, 385–396; 57/74

[56] References Cited

U.S. PATENT DOCUMENTS

| | | | |
|---|---|---|---|
| 1,425,000 | 8/1922 | Frost | 384/472 |
| 1,715,978 | 6/1929 | Bénit | 384/469 X |
| 1,920,326 | 8/1933 | Schuck et al. | 384/472 |
| 2,062,920 | 12/1936 | Mapes et al. | 384/465 |
| 2,169,878 | 8/1939 | Linn | 384/472 |
| 2,224,255 | 12/1940 | Delaval-Crow | 384/415 |
| 2,439,709 | 4/1948 | Asbury | 384/472 |
| 2,597,405 | 5/1952 | Tholl | 384/465 |
| 4,541,736 | 9/1985 | Giebeler, Jr. | 384/465 |

*Primary Examiner*—Thomas R. Hannon
*Attorney, Agent, or Firm*—M. Lawrence Oliverio

[57] ABSTRACT

A rotatable member (3) has on its outside surface a contoured surface portion (15) which widens conically upwards in diameter, is contiguous with a lubricant storage chamber (14) and extends axially to near a bearing (11) by which the rotatable member (3) is rotatably mounted in a housing (4). Lubricant discharging downwardly by gravity from the bearing (11) returns upwardly along the surface part (15) and reaches a zone which is below the bearing (11) and from which the same takes up lubricant. The bearing (11) is therefore supplied with lubricant during the rotation of the rotatable member (3) so that uniform lubrication in a thin layer is ensured. The mounting is used more particularly in a cap of a cap spinning machine or cap twisting machine.

28 Claims, 2 Drawing Sheets

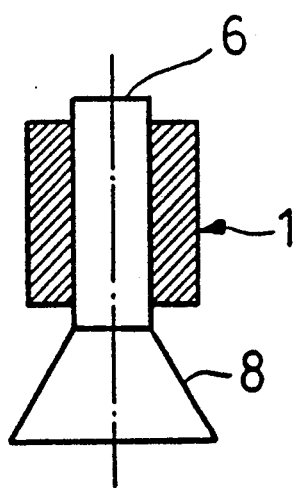
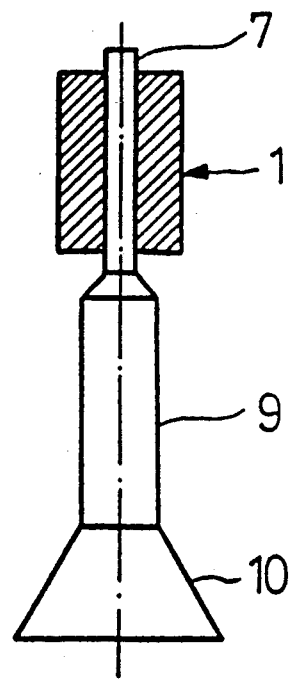
Fig. 2a
Fig. 2b

MOUNTING MECHANISM FOR A MEMBER ADAPTED TO ROTATE AT HIGH SPEED AROUND A VERTICAL AXIS

BACKGROUND OF THE INVENTION

The present invention relates to mounting mechanisms for devices adapted to rotate at high speed around a vertical axis in yarn spinning machines and more particularly for use in connection with the cap members of a cap spinning or cap twisting machine.

Since the rotatable cap member of a cap spinning or cap twisting machine has its rotational axis disposed vertically, lubricant material used therewith tends to discharge downwardly under the force of gravity resulting in the potential loss of lubricant supply for the bearing on which the cap is mounted. If the bearing is underlubricated bearing friction may increase to such an extent that the required high speeds of the rotatable member may not be maintainable or attainable and the bearing may overheat. In the case of a cap member on a cap spinning or cap twisting machine, yarn tension can be adversely affected by bearing friction. Excessive yarn tension which may cause yarn breakages may result from excessive bearing friction which, in turn, is the result of underlubrication of the bearing. Underlubrication of the bearing, with the attendant risk of excessive yarn tension is just as much to be avoided as irregular bearing lubrication, which can lead to undesirable variations in yarn tension. Overlubrication of the bearing should also be avoided since overlubrication can have an adverse effect on bearing friction and, thus, on the running of the rotatable cap member. Irregular distribution of lubricant in the mounting mechanism may cause unwanted losses of lubricant through leakage.

It is therefore an object of the invention to provide a mounting mechanism for a spinning member adapted to rotate at high speed around a vertical axis such that constant lubrication of the bearing is maintained with a thin film of lubricant in the bearing and with reduced risk of loss of lubricant due to leakage.

SUMMARY OF THE INVENTION

In accordance with the invention the member adapted to rotate within a bearing is provided on its outside surface with at least one surface portion protruding radially therefrom beneath the bearing and widening continuously upwards in diameter, is contiguous with a lubricant storage chamber and extends axially upward with its widest diameter point extending up to near the bearing.

A possible explanation for the advantageous nature of the invention is that as the rotatable member rotates in a mounting mechanism according to the invention a lubricant circuit is created in which lubricant dripping downwards from the bearing under force of gravity is returned upwardly along the widening or protruding surface portion of the rotatable member and reaching a point which is immediately below the bearing from which it is taken up directly by the bearing or otherwise indirectly from a lubricant holding or absorbing member as described below. A possible explanation for the lubricant rising along the gradually widening surface portion of the rotatable member is that near the bearing where the diameter of the protruding surface is greatest the lubricant is slung or hurled away from the surface by increased centrifugal forces and fresh lubricant is sucked up by the bearing from below by cohesion forces to replace the lubricant thus hurled away. Another possible explanation is that the lubricant tends to be distributed over the periphery of the surface part in a cohesive layer which becomes thinner in proportion as the diameter of the surface part increases, so that fresh lubricant flows upward in order not to interrupt the layer, probably due to centrifugal and cohesion forces. The layer of lubricant in the bearing of a mounting mechanism according to the invention may acquire the desired reduced thickness because the lubricant returning from below the bearing along the protruding surface portion is sucked into the bearing slowly instead of being injected directly thereinto. The return to the bearing of the lubricant dripping downwards prevents the formation below the bearing of a substantial lubricant pool which might cause leakage losses.

Further in accordance with the invention there is provided means for returning downwardly travelling lubricant and means for storing lubricant which has risen along the radially protruding surface portion of the rotatable member in a porous sleeve member before being taken up by the bearing. The distance travelled by the lubricant in the circuit is therefore reduced and a supply of lubricant is formed below the bearing and supplied and bearing mechanism with lubricant to a desired extend. The invention further enables the aforementioned retarding and storage effects to be achieved economically.

The invention further provides means for ensuring that the lubricant which has risen along the radially widening surface portion of the rotatable member s not hurried or slung into the bearing directly which might lead to a surplus of lubricant in the bearing. Means such as a porous absorbing member are provided for initial lubricant collection below the bearing such that the lubricant may be taken up by the bearing as required.

The invention further provides means for enabling a lubricant circuit similar to one formed below a first top bearing to be formed during operation below a second bearing such that the same is properly lubricated as described above. The invention further provides that while the rotatable member is rotating and also while it is stationary the lubricant drips below the second bearing only slightly and that loss of lubricant to leakage below the bearing are obviated especially during stoppages.

The invention further provides an alternative to the use of a separate sleeve element for providing the radially protruding surface portions which widen upwards in diameter.

Each bearing may include a layer of grease for purposes of acting as a means of conveying the lubricant to be returned to the bearing. The layer of grease promotes the return flow of lubricant from the protruding surface to the bearing and expedites the distribution of the lubricant in the bearing.

The invention further provides for the use of a mounting mechanism according to the invention in connection with a freely rotatable cap member of a cap spinning or cap twisting device. With rotatable members of this kind, a mounting mechanism according to the invention enables cap spinning speeds to be raised to levels such that cap spinning becomes at least equivalent to or even better than other spinning processes with excessive or irregular bearing friction which acts directly on yarn tension being avoided.

An advantage of a mounting mechanism according to the invention is that service intervals for bearing lubrication can be relatively long.

BRIEF DESCRIPTION OF THE DRAWINGS

One embodiment of the invention is described hereinafter and is illustrated in the drawings wherein:

FIG. 2A is a diagrammatic view showing the disposition of the mounting mechanism of FIG. 1 in connection with a first cap mechanism design; and FIG. 2B is a diagrammatic view showing the disposition of the mounting mechanism of FIG. 1 in connection with another cap mechanism design.

DETAILED DESCRIPTION

Figure 1:
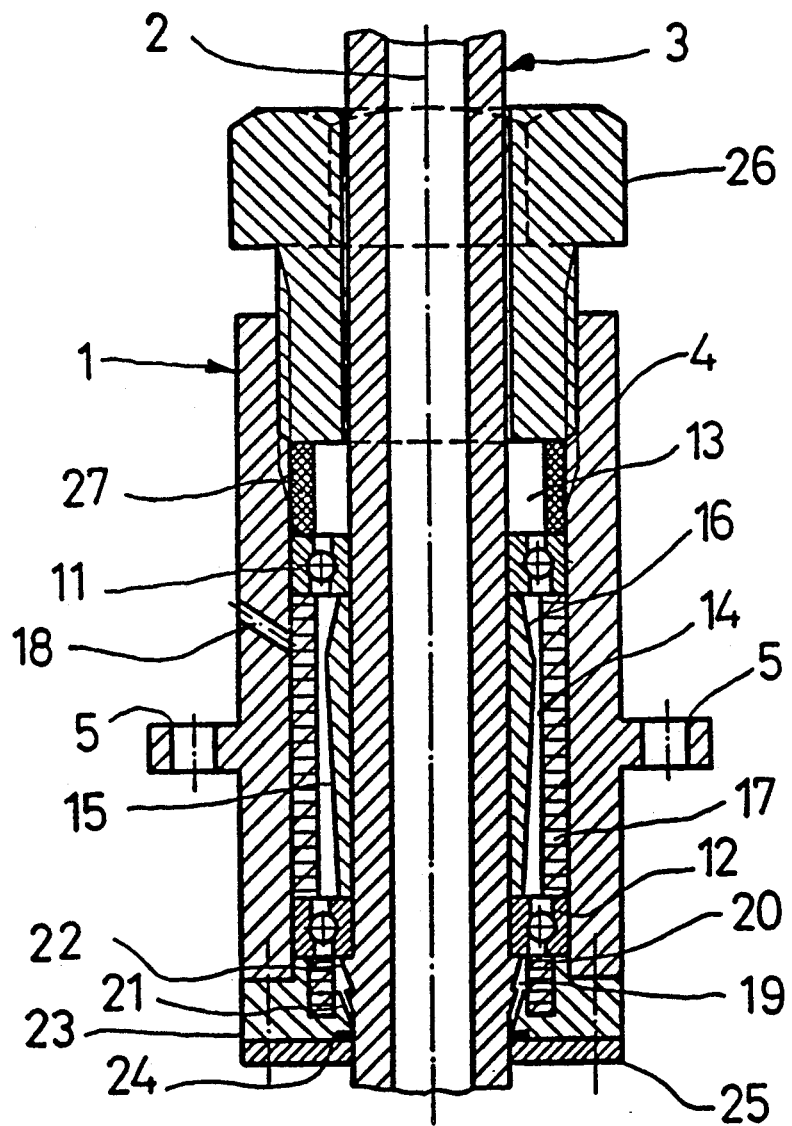
FIG. 1 is a cross-sectional view of a mounting mechanism according to the invention shown mounting a cap member of a cap spinning twisting device.

There is shown in FIG. 1 a mounting mechanism 1 for a cap member 3 rotatable around a vertical axis 2. The mounting mechanism 1 comprises a housing 4 which extends coaxially around the member 3 and which can be mounted by conventional means to a suitable portion (not shown) of a cap spinning or twisting machine such as by means of screws (not shown) at appropriate positions 5. The rotatable member 3 typically comprises a hollow cylindrical member 6 of, for example, a cap design such as shown in FIG. 2A or a cylindrical shaft journal 7 of, for example, a cap design such as shown in FIG. 2B.

In the case of the cap design such as shown in FIG. 2A the hollow cylindrical portion 6 merges at its bottom into a conical hollow portion 8. The mounting mechanism 1 is typically engaged around portion 6.

In the case of the cap design shown in FIG. 2B a hollow cylindrical portion 9 merges upwardly into a shaft journal portion 7 of smaller diameter than the portion 9, the same merging downwardly into a conical hollow portion 10. The mounting mechanism 1 is engaged around shaft journal portion 7 of the cap shown in FIG. 2B.

The cap mechanisms 6, 8 and 7, 9, 10 are freely rotatably mounted within mounting mechanism 1, i.e. when mounted, a cap mechanism is not directly driven by motor means but is rotatably driven, as well known in the art, by frictional engagement with a yarn which is being rotated around the inside conical hollow surface of the cap and wound onto a rotating take up cap or bobbin.

As is also apparent from FIG. 1, the member 3 is rotatably mounted in the housing 4 in an axially vertical orientation by way of two bearings 11, 12 spaced axially apart from each other and disposed in an annular chamber 13 between the member 3 and the housing 4. A storage chamber 14 which is a portion of the annular chamber 13 is disposed between the two bearings 11 and 12. The chamber 14 is adapted to receive liquid lubricant, as described more fully hereinafter. Both the bearings 11, 12 include a layer of grease.

At its radially inner surface or side the chamber 14 is bounded by a protruding surface portion 15 which continuously widens in diameter upwardly in a conical manner and which is disposed around the outside surface of the rotatable member 3. At its narrowest-diameter end the conical surface portion 15 is contiguous with the inside race of bottom bearing 12. The point of greatest diameter of the surface protrusion 15 is disposed at a position spaced a small distance beneath the top end bearing 11, typically between about 1 and about 5 millimeters beneath bearing 11. At its point of widest diameter, the surface portion 15 merges into a surface portion 16 which extends conically upwards with decreasing diameter and is contiguous at its narrowest diameter end with the inner race of top bearing 11.

The surface protrusions 15, 16 essentially form a sleeve around the cylindrical outside surface of rotatable member 3. The sleeve 15, 16 may be formed together with the rotatable member 3 as a unitary or integral body 3.

The storage chamber 14 has a porous member 17 disposed between the housing 4 and the surface portions 15, 16 of the member 3, a gap being left between the inside surface of the member 17 and the surface portions 15, 16. The porous member 17 forms a sleeve comprised of a foam substance whose outside surface contacts the inside surface of the housing 4. The sleeve-like porous member 17 is typically impregnated with lubricant which is used to lubricate the two bearings 11, 12. As shown in FIG. 1, the porous sleeve extends the axial length of the storage chamber 14 up to the bottom surface of the bearing 11.

A bore 18 is typically provided which extends at a downward inclination in the wall of the housing 4 and terminates at its inner end in the storage chamber 14. The chamber 14 can be filled up as required with lubricant through the bore 18.

A further storage chamber 19, an extension of annular chamber 13, is disposed below the bottom bearing 12 and is also adapted to receive lubricant. The chamber 19 also includes a porous member 20 which, like the member 17, is formed of a sleeve preferably comprised of a foam material. At its inner end the chamber 19 is bounded by two consecutive surface portions 21, 22 which widen conically upwards in diameter and which are interconnected by a radial surface portion or step, the top conical surface portion 22 extending upwardly as far as the bottom end of bearing 12 and contiguous therewith. The portions 21, 22 are spaced apart from the inside surface of the porous member 20.

The annular chamber 13 is closed at its bottom end by a cover 23 clamped by an annular disc 25 by conventional means such as screws (not shown) to the bottom end of the housing 4. The cover 23 is formed with an annular recess receiving the sleeve-like member 20. An annular shoulder of the cover 23 acts as support surface for the outer race of the bottom bearing 12. The inner race of bearing 12 rests on a radially extending surface on the top end of the surface portion 22.

The radially extending surface portions 21, 22 are disposed on the outside cylindrical surface of rotatable member 3 and, similar to surface portions 15, 16, may comprise a separate sleeve member fixedly engaged to the member 3 for co-rotation therewith or may be integrally formed together with member 3 to form a unitary structure. A ring seal 24 is disposed between the cover 23 and the disc 25 and by way of its radially inside surface engageably surrounds the outside surface of the member 3.

The annular chamber 13 is closed at its top end by a screw 26 having an external screwthread which engages an internal screwthread at the top end of the housing 4. A spring element 27 is disposed between the screw 26 and the top bearing 11 in the annular chamber 13 and presses on the axially mobile outer race of the top bearing 11.

When a lubricant such as oil is present in the storage chambers 14, 19 and the member 3 is rotating at high speed, a lubricant circuit arises in each of the two storage chambers 14, 19 such that lubricant travelling downwards by gravity from the bearings 11 and 12 returns upwardly to the respective bearings 11, 12. It is believed that the lubricant circuit in the storage chamber 14 is such that the lubricant travelling downwards from the bearing 11, for example, by way of the porous member 17, rises along the surface portion 15 and at the point of maximum-diameter of the surface portion 1 is hurled into the porous member 17, the same receiving or absorbing the lubricant thus hurled and storing it below the bearing 11. The bearing 11 sucks the stored lubricant from porous member 17 in between the races of the bearing 11, an equilibrium between downwardly travelling lubricant and lubricant being sucked into the bearing 11 thus being established. There is a possibility that the suction arising in the bearing 11 may cause the lubricant in the porous member 17 to creep up and issue from the top end of the porous member 17 into the bearing 11.

The surface portions 21, 22 not only promote the upwards return of the lubricant discharging downwards from the bearing 12 but are also effective, particularly when the member 3 is stationary, to prevent or at least impede the discharge of lubricant from the chamber 13. The radially extending surface portion or step between the two surface portions 21 and 22 is particularly effective in inhibiting the flow of lubricant when the rotatable member 3 is stationary. Lubricant can also creep up in the porous member 20 when the bearing 12 sucks up lubricant from below.

Since the lubricant is returned to the bearings 11, 12, at least while the member 3 is rotating, the formation of a large pool of lubricant a the bottom of chamber 13 and the possibility of lubricant leakage is thus prevented. To insure against the collection of lubricant below the bearing 12 and potential failure to return upwardly, particularly during stoppage times in which the lubricant circuits cannot form, the seal 24 ensures that the lubricant cannot discharge from the storage chamber 19.

Typically grease is provided in or on the bearings 11, 12 which enhances the transfer of lubricant from the porous members 17, 20 into the bearings and the distribution of such lubricant therein since such grease has a conveying effect on the lubricant.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. A mounting mechanism for a cylindrical member adapted to rotate at high speed around a vertical axis, the mounting mechanism comprising a housing and a bearing means engaged around the member for rotatably supporting the member in an axially vertical orientation in the housing and means for maintaining liquid lubricant within the bearing, the means for maintaining comprising a lubricant storage chamber formed between the housing and the rotatable member for receiving lubricant dripping downwardly, the storage chamber being disposed below the bearing and containing a supply of the lubricant, the rotatable member having a surface element for returning lubricant upwardly from the chamber during rotation of the member, the surface element extending axially along the surface of the member and widening continuously upwardly in diameter to a point of maximum diameter spaced near and below the bearing means; and further comprising a second bearing means engaged around the rotatable member at a position below the widening surface element, the storage chamber extending between the first and second bearing means, the rotatable member having a second surface element extending axially along the surface of the member beneath the second bearing means and widening upwardly in diameter.

2. A mounting mechanism according to claim 1 wherein a porous member is disposed between the housing and the widening surface element, the porous member receiving liquid lubricant in the chamber for return to the bearing.

3. A mounting mechanism according to claim 2 wherein the widening surface element comprises a sleeve fixedly engaged around the outside surface of the rotatable member for co-rotation therewith.

4. A mounting mechanism according to claim 2 wherein the bearing means includes means for attracting lubricant from the storage chamber into the bearing means.

5. The mounting mechanism according to claim 2 wherein the surface element is formed integrally on the outside surface of the rotatable member such that the surface element and the rotatable member comprises a unitary structure.

6. A mounting mechanism according to claim 1 wherein the widening surface element comprises a sleeve fixedly engaged around the outside surface of the rotatable member for co-rotation therewith.

7. A mounting mechanism according to claim 6 wherein the bearing means includes means for attracting lubricant from the storage chamber into the bearing means.

8. The mounting mechanism according to claim 6 wherein the surface element is formed integrally on the outside surface of the rotatable member such that the surface element and the rotatable member comprises a unitary structure.

9. A mounting mechanism according to claim 1 wherein a second lubricant storage chamber is formed between the housing and the rotatable member beneath the second bearing means, the second storage chamber including a second sleeve of foam material extending coaxially around the second widening surface element and being spaced radially apart from the second surface element.

10. A mounting mechanism according to claim 1 wherein the rotatable member has a third surface element extending axially along the surface of the member beneath the second bearing means and widening upwardly in diameter, a step being formed between the second and third surface elements at the point of widest diameter of one of the second and third surface elements.

11. A mounting mechanism according to claim 1 wherein the bearing means includes means for attracting lubricant from the storage chamber into the bearing means.

12. A mounting mechanism according to claim 1 wherein the bearing means includes means for attracting lubricant from the storage chamber into the bearing means.

13. A mounting mechanism in accordance with claim 1 wherein the rotatable member comprises a cap spinning member of a cap spinning machine.

14. A mounting mechanism in accordance with claim 1 wherein the rotatable member comprises a cap spinning member of a cap spinning machine.

15. The mounting mechanism according to claim 1 wherein the surface element is formed integrally on the outside surface of the rotatable member such that the surface element and the rotatable member comprises a unitary structure.

16. The mounting mechanism according to claim 1 wherein the surface element is formed integrally on the outside surface of the rotatable member such that the surface element and the rotatable member comprises a unitary structure.

17. A mounting mechanism for a cylindrical member adapted to rotate at high speed around a vertical axis, the mounting mechanism comprising a housing and a bearing means engaged around the member for rotatably supporting the member in an axially vertical orientation in the housing and means for maintaining liquid lubricant within the bearing, the means for maintaining comprising a lubricant storage chamber formed between the housing and the rotatable member for receiving lubricant dripping downwardly, the storage chamber being disposed below the bearing and containing a supply of the lubricant, the rotatable member having a surface element for returning lubricant upwardly from the chamber during rotation of the member, the surface element extending axially along the surface of the member and widening continuously upwardly in diameter to a point of maximum diameter spaced near and below the bearing means, the porous member comprising a sleeve of foam material extending coaxially around the upwardly widening surface element, the sleeve having an inside surface spaced apart radially from the surface element.

18. A mounting mechanism according to claim 17 wherein the widening surface element comprises a sleeve fixedly engaged around the outside surface of the rotatable member for co-rotation therewith.

19. A mounting mechanism according to claim 17 further comprising a second bearing means engaged around the rotatable member at a position below the widening surface element, the storage chamber extending between the first and second bearing means, the rotatable member having a second surface element extending axially along the surface of the member beneath the second bearing means and widening upwardly in diameter.

20. A mounting mechanism according to claim 17 wherein the bearing means includes means for attracting lubricant from the storage chamber into the bearing means.

21. The mounting mechanism according to claim 17 wherein the surface element is formed integrally on the outside surface of the rotatable member such that the surface element and the rotatable member comprises a unitary structure.

22. A mounting mechanism for a cylindrical member adapted to rotate at high speed around a vertical axis, the mounting mechanism comprising a housing and a bearing means engaged around the member for rotatably supporting the member in an axially vertical orientation int eh housing and means for maintaining liquid lubricant within the bearing, the means for maintaining comprising a lubricant storage chamber formed between the housing and the rotatable member for receiving lubricant dripping downwardly, the storage chamber being disposed below the bearing and containing a supply of the lubricant for lubrication of the bearing means, and means for delivering lubricant upwards from the storage chamber to the bearing means during rotation of the member within the bearing means; the means for delivering comprising a surface element extending axially along and around the outside surface of the rotatable member, the surface element widening in diameter upwardly along the outside surface of the rotatable member, and a porous sleeve member extending coaxially around the upwardly widening surface element, the porous member receiving lubricant within the storage chamber and returning the lubricant to the bearing means.

23. The mounting mechanism of claim 22 wherein the lubricant in the storage chamber coats the upwardly widening surface of the surface element during rotation of the rotatable member, at least some of the lubricant coated on the upwardly widening surface of the surface element being returned to the bearing means at a rate sufficient to replace lubricant which travels downwardly from the bearing means under force of gravity.

24. The mounting mechanism of claim 23 wherein the surface element comprises a sleeve member fixedly engaged around the outside surface of the rotatable member for co-rotation therewith.

25. The mounting mechanism of claim 23 wherein the surface element is integrally formed on the outside surface of the rotatable member such that the surface element and the rotatable member comprise a unitary structure.

26. The mounting mechanism of claim 22 wherein the means for delivering comprises a grease material in the bearing means for attracting lubricant material from the storage chamber.

27. The mounting mechanism of claim 22 wherein the surface element comprises a sleeve member fixedly engaged around the outside surface of the rotatable member for co-rotation therewith.

28. The mounting mechanism of claim 22 wherein the surface element is integrally formed on the outside surface of the rotatable member such that the surface element and the rotatable member comprise a unitary structure.

* * * * *